(12) United States Patent
Wang et al.

(10) Patent No.: US 12,199,455 B2
(45) Date of Patent: Jan. 14, 2025

(54) WIRELESSLY POWERED SELF-ALIGNING LAMP

(71) Applicant: GOODWELL INTERNATIONAL (HONG KONG) COMPANY LIMITED, Hong Kong (CN)

(72) Inventors: Xiaobing Wang, Hong Kong (CN); Liangqing Li, Hong Kong (CN)

(73) Assignee: GOODWELL INTERNATIONAL (HONG KONG) COMPANY LIMITED, Hong Kong (CN)

( * ) Notice: Subject to any disclaimer, the term of this patent is extended or adjusted under 35 U.S.C. 154(b) by 0 days.

(21) Appl. No.: 18/659,353

(22) Filed: May 9, 2024

(65) Prior Publication Data

US 2024/0297537 A1    Sep. 5, 2024

Related U.S. Application Data

(63) Continuation of application No. PCT/CN2022/089729, filed on Apr. 28, 2022.

(30) Foreign Application Priority Data

Nov. 9, 2021    (CN) .......................... 202111322460.2

(51) Int. Cl.
*H02J 50/90* (2016.01)
*F21S 9/02* (2006.01)
(Continued)

(52) U.S. Cl.
CPC ................. *H02J 50/90* (2016.02); *F21S 9/02* (2013.01); *F21V 3/00* (2013.01); *H02J 50/10* (2016.02)

(58) Field of Classification Search
CPC ... H02J 50/90; H02J 50/10; F21V 3/00; F21S 9/02

See application file for complete search history.

(56) References Cited

U.S. PATENT DOCUMENTS 2,490,185 A * 12/1949 Work ..................... G09B 27/08
434/145
2,511,394 A * 6/1950 Wynnyk ................... F21V 1/00
362/256
(Continued)

FOREIGN PATENT DOCUMENTS

CN    109027739 B  *  4/2024  ............... B44C 5/00

*Primary Examiner* — Arman B Fallahkhair
(74) *Attorney, Agent, or Firm* — Westbridge IP LLC

(57) ABSTRACT

A wirelessly powered self-aligning lamp includes: a lampshade, which is at least partially made of a light-transmitting material; an individual component, which is movably arranged in the lampshade and on which a light source and a wireless power receiving coil are fixedly mounted, the receiving coil being used to power the light source; and a base fixedly provided with a wireless power transmitting coil that cooperates with the wireless power receiving coil of the individual component. When the lampshade is positioned at will on the base, the individual component in the lampshade has a movement trend relative to the base to align the receiving coil on the individual component with the transmitting coil on the base. In the lamp of the present application, the lampshade is internally provided with a gravity or magnetic adjustment mechanism that enables the power coil to be self-aligned.

16 Claims, 15 Drawing Sheets

(51) Int. Cl.
    *F21V 3/00*          (2015.01)
    *H02J 50/10*        (2016.01)

(56) References Cited

U.S. PATENT DOCUMENTS

| | | | | |
|---|---|---|---|---|
| 3,292,361 | A * | 12/1966 | Redmond | G04B 19/226 |
| | | | | 968/169 |
| 3,435,201 | A * | 3/1969 | Kemenczky | A47G 33/0809 |
| | | | | 362/256 |
| 4,451,874 | A * | 5/1984 | Friedman | G09B 27/08 |
| | | | | 362/311.06 |
| 5,605,391 | A * | 2/1997 | Wood | F21V 17/04 |
| | | | | 362/444 |
| 5,676,550 | A * | 10/1997 | Giamportone | G09B 23/40 |
| | | | | 434/130 |
| 7,012,855 | B1 * | 3/2006 | Loaiza | G04B 19/226 |
| | | | | 368/17 |
| 8,294,542 | B2 * | 10/2012 | Wang | H02N 15/00 |
| | | | | 361/144 |
| 8,823,479 | B2 * | 9/2014 | Wang | H01F 7/0236 |
| | | | | 335/296 |
| 9,959,962 | B2 * | 5/2018 | Bassett | H04S 7/304 |
| 10,870,064 | B1 * | 12/2020 | Standing | A63H 30/04 |
| 2007/0264618 | A1 * | 11/2007 | Fuller | G09B 27/08 |
| | | | | 434/131 |
| 2020/0248893 | A1 * | 8/2020 | Jeon | F21V 3/049 |
| 2024/0021107 | A1 * | 1/2024 | Yu | G09B 23/40 |

\* cited by examiner

WIRELESSLY POWERED SELF-ALIGNING LAMP

CROSS-REFERENCE TO RELATED APPLICATIONS

This application is a continuation of International Application No. PCT/CN2022/089729, filed on Apr. 28, 2022, which claims priority to Chinese Patent Application No. 20111322460.2, filed on Nov. 9, 2021. All of the aforementioned applications are incorporated herein by reference in their entireties.

TECHNICAL FIELD

The present application relates to a wireless power supply lamp.

BACKGROUND

Wireless power supply technologies have been widely used in various electric devices including mobile phones, lamps, toys, rotating devices, and the like.

Usually, when supplying a lamp with wireless power, a lamp body having a wireless power supply receiver coil is placed on a power supply base having a wireless power supply transmitter coil. In the case that the lamp body is, for example, a lamp ball having a spherical lampshade, due to the randomness of the spherical lamp when placed relative to the base, it is usually impossible to quickly and effectively align the receiver coil therein with the transmitter coil in the base to achieve efficient wireless power supply.

SUMMARY

An object of the present application is to provide a wireless power supply lamp, which can at least overcome some disadvantages existing in the above-mentioned prior art.

A lamp provided according to the present application includes:
- a lampshade, at least part of which is made of a light-transmitting material;
- an independent unit, movably disposed in the lampshade, on which a light source and a wireless power supply receiver coil are fixedly mounted, where the receiver coil is configured to supply power to the light source; and
- a base which is provided fixedly with a wireless power supply transmitter coil to be coupled with the wireless power supply receiver coil of the independent unit,
- when the lampshade is randomly positioned on the base, the independent unit in the lampshade has relative to the base a movement tendency which enables the receiver coil on the independent unit and the transmitter coil on the base to be aligned with each other.

In the present disclosure, the expression "the receiver coil and the transmitter coil aligned with each other" means that effective power transmission can be achieved therebetween under wireless power supply. In other words, the relative orientation or position of the receiver coil to the transmitter coil is so set that the electric power transmission therebetween tends to be maximized.

According to a specific embodiment of the lamp of the present application, the movement tendency of the independent unit can result from its own gravity. In this case, for example, the receiver coil and the transmitter coil may be conveniently aligned vertically (up and down).

Alternatively or additionally, the independent unit and the base may be respectively provided with a magnetic member, and the movement tendency of the independent unit can result from the magnetic attraction force generated by the magnetic member on the independent unit and the magnetic member on the base. In this case, the movement of the individual unit can be faster and/or more accurate.

According to the lamp of the present application, the lampshade can preferably be temporarily positioned on the base in various postures.

According to the lamp of the present application, the lampshade may be a spherical lampshade or other suitable modeling such as a round belly vase. The lampshade may be of a two-half structure, one half made of a well light-transmitting material such as a translucent material, and the other half made of a bad light-transmitting material such as an opaque material. Of course, the lampshade may also be made of a single light-transmitting material.

According to the lamp of the present application, the lampshade can be a closed or semi-closed lampshade, and independent unit is shaped to be freely rollable relative to the inner wall of the lampshade.

According to the present application, the independent unit may have a transparent housing, and the light source and the receiver coil are both fixedly disposed in the transparent housing.

According to the present disclosure, the independent unit may further include a partition plate fixedly secured in, and substantially separating the inner space of, the transparent housing, the partition plate is made of a light isolation material, and the light source(s) is arranged on either side (or both sides) of the partition plate. In this case, the receiver coil may be fixedly secured at the bottom of the separator. The lampshade is preferably a spherical lampshade made of a light-transmitting material, and the transparent or light-transmitting housing of the independent unit is preferably a spherical housing with an outer diameter slightly smaller than the inner diameter of the spherical lampshade.

According to the lamp of the present application, the base may have a movable element on which is positioned the lampshade so that the lampshade can be moved correspondingly through actuating the movable element of the base.

According to the present application, the power supply base may further include a motor for actuating the movable element to rotate. In this case, the direction of rotation axis of the movable element is adjustable when the movable element is rotating relative to the base.

According to the lamp of the present application, the lampshade may be a molded piece and/or a 3D printed piece.

According to the lamp of the present application, the lampshade may have a substantially spherical uneven outer surface.

According to the lamp of the present application, the appearance of the lampshade is designed to be a celestial body selected from the group consisting of moon, earth, other planets and asteroids.

According to the lamp of the present application, the independent unit in the lampshade can also be provided fixedly with a magnet, and the base is in the form of a magnetic levitator, so that the independent unit and thus the lampshade can be levitated above the base through being positioned by the magnet. Not only the lampshade of the magnetic levitation lamp can thus be arbitrarily turned, but also the magnet fixed thereon can be automatically oriented vertically relative to the lampshade due to the self-alignment of the movable independent unit in the gravity direction. Therefore, the problem that the closed levitating object provided with a movable magnet is uneasy to be centered and levitated over the base is resolved.

According to the lamp of the present application, the lampshade may be a spherical housing made of an elastic transparent material, and filled therein with a fluid such as liquid or air. In addition, the independent unit may further be provided fixedly with a rechargeable battery which can be charged through the wireless power supply receiver coil and can supply power to the light source. This embodiment conveniently resolves the problem that it is difficult to re-charge a battery disposed in an existing bouncing light-emitting ball.

According to the lamp of the present application, the base may take the form of a tripod
 with three V-shaped supporting legs being connected to each other, and include an upper housing and a lower housing between which the wireless power supply transmitter coil is form-fit sandwiched. This configuration makes the overall device extremely simple and compact.

A lamp to be used with a wireless charger base, further provided according to the present application, includes:
 a lampshade at least partially made of a light-transmitting material; and
 an independent unit, movably disposed in the lampshade, on which a light source and a wireless power supply receiver coil are fixedly mounted, where the receiver coil is configured to supply power to the light source.

The base is provided fixedly with a wireless power supply transmitter coil to be coupled with the wireless power supply receiver coil of the independent unit, and when the lampshade is randomly positioned on the base, the independent unit in the lampshade has relative to the base a movement tendency which enables the receiver coil on the independent unit and the transmitter coil on the base to be aligned with each other.

According to the lamp of the present application, due to the gravity or magnetic force adjusting mechanism, arranged in the lampshade, capable of self-aligning the power supply coil, the placement or suspension posture of the lampshade on the power supply base can be unlimited, so that any specific visual lighting effect, such as the effect of a free moon phase lamp, can be realized conveniently.

DETAILED DESCRIPTION OF THE EMBODIMENTS

The present application will be further described below with reference to the embodiments and the accompanying drawings, and it should be understood by those skilled in the art that the embodiments and drawings are only for better understanding of the present application and are not intended to be limiting.

Figure 1:
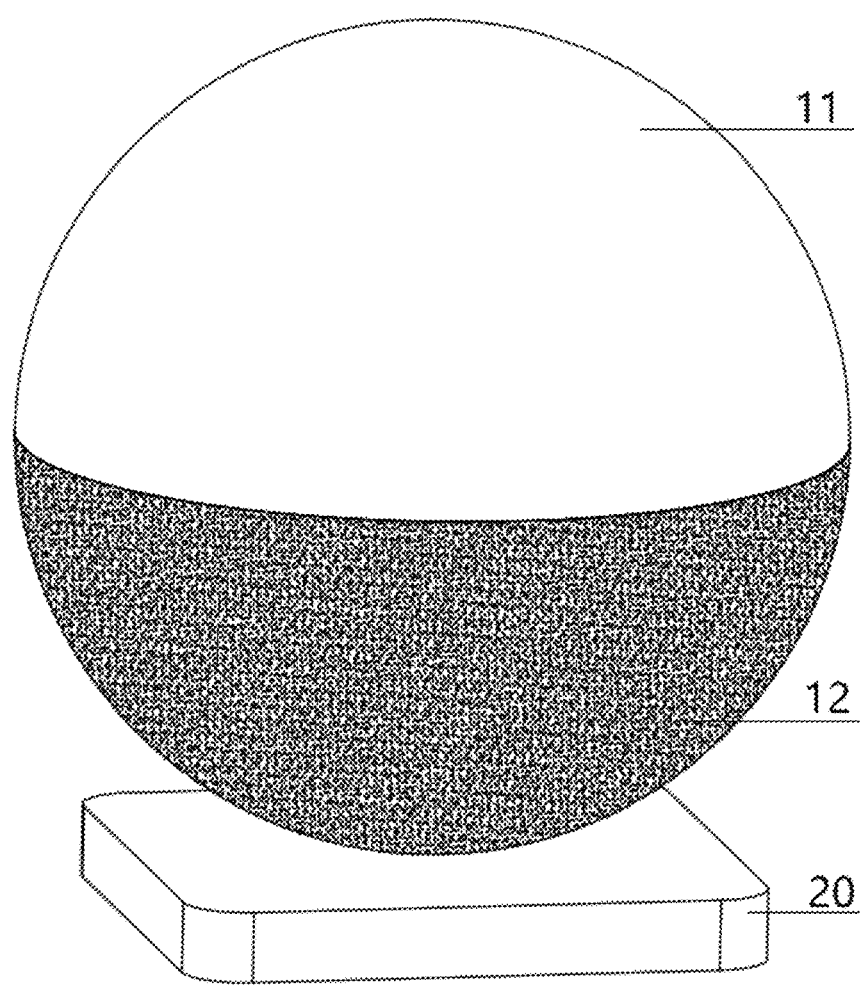
FIG. 1 is a structural perspective view of a lamp with a yin-yang lampshade according to the present application.

FIG. 1 shows a perspective view of a spherical lamp according to the present application, which includes a base 20 and a yin-yang spherical lampshade consisting of a hemispherical housing 11 with better light transmittance and another hemispherical housing 12 with poorer light transmittance or being opaque. When the light source in the yin-yang spherical lampshade is lightened, a visual lighting effect similar to a half moon can be obtained; and when the observation angle or the placement posture of the spherical lampshade on the base is changed, a correspondingly changing moon phase (for example, a crescent) visual lighting effect can be obtained.

FIG. 2 to FIG. 8 are sectional views respectively showing specific structures of different embodiments of a lamp according to the present disclosure.

Figure 2:
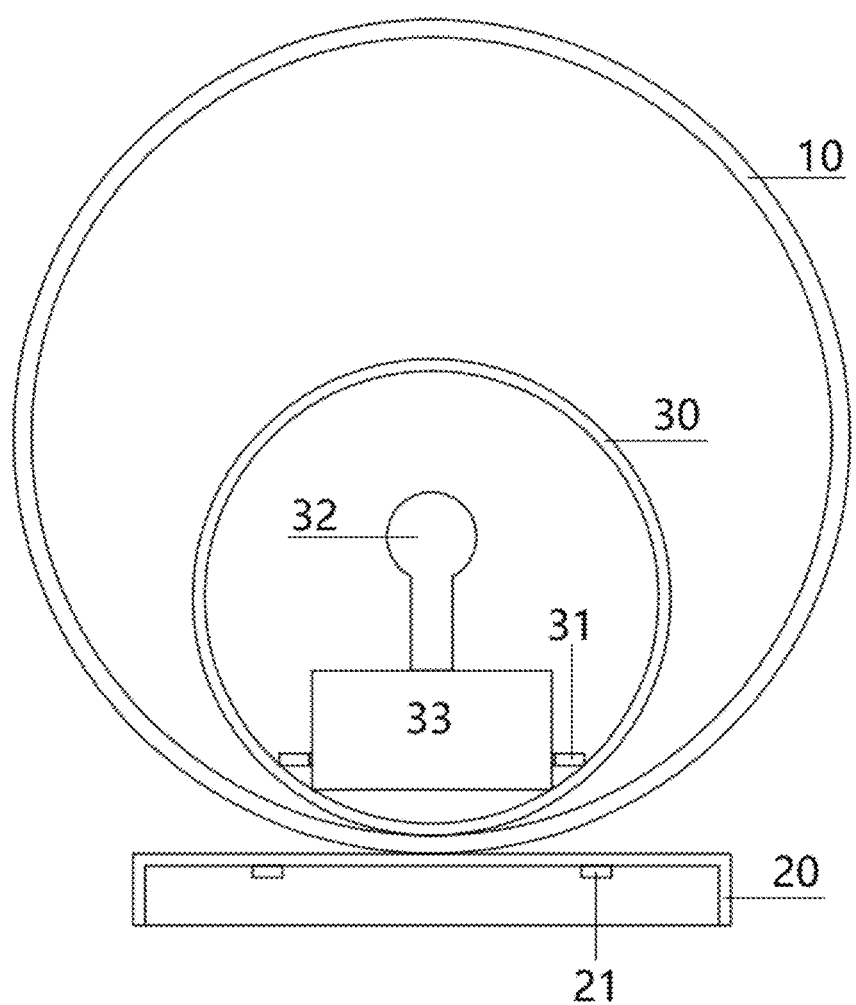
FIGS. 2-8 are schematic structural sectional views of different embodiments of a lamp according to the present application, respectively.

The lamp shown in FIG. 2 is generally composed of a spherical lampshade 10 and a power supply base 20. The lampshade 10 is further internally provided with a free-rolling independent unit in the form of a light-emitting ball.

Figure 7:
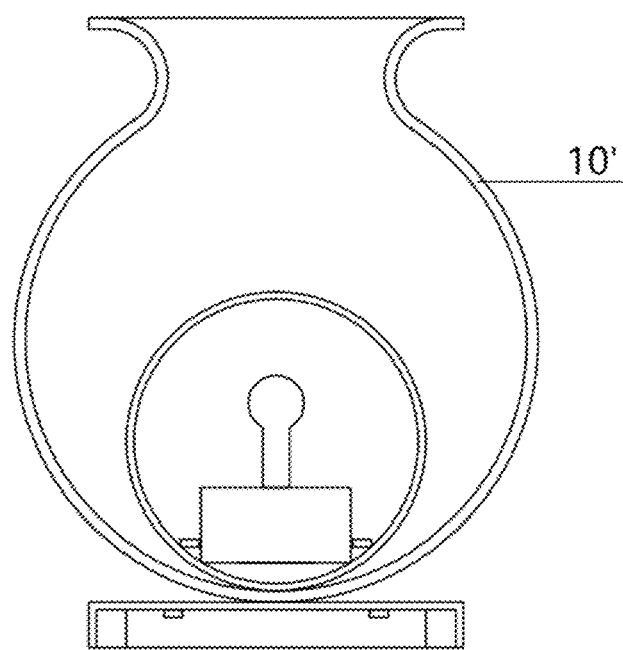
Figure 8:
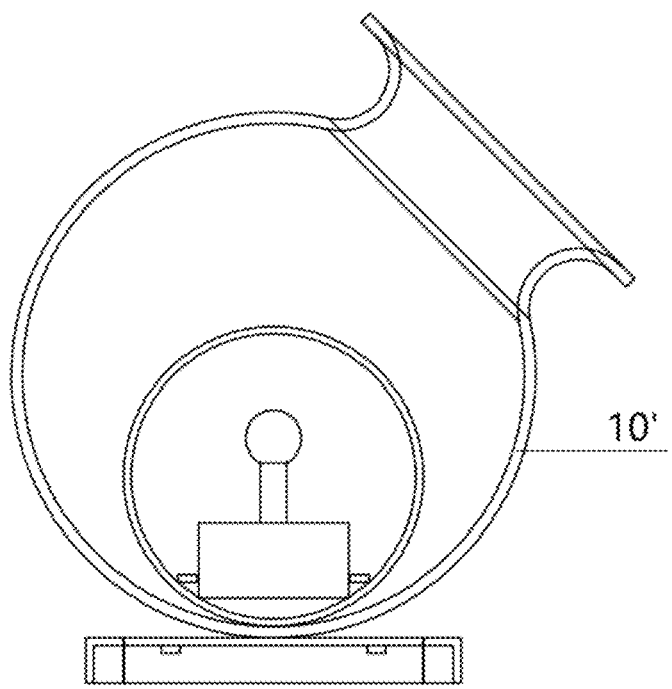
Figure 9:
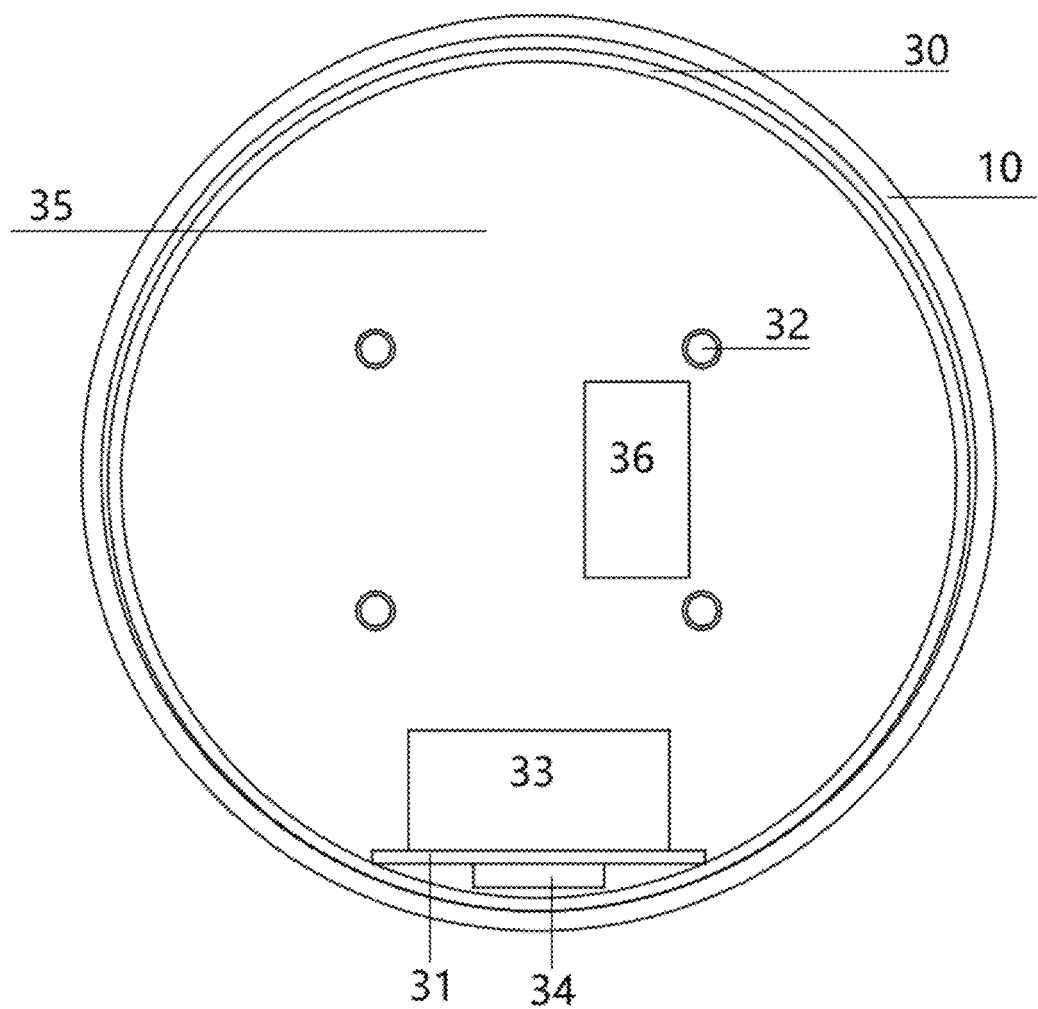
FIGS. 9 and 10 are front and side views, respectively, of a lamp having an internal separator plate in accordance with the present application.
Figure 10:
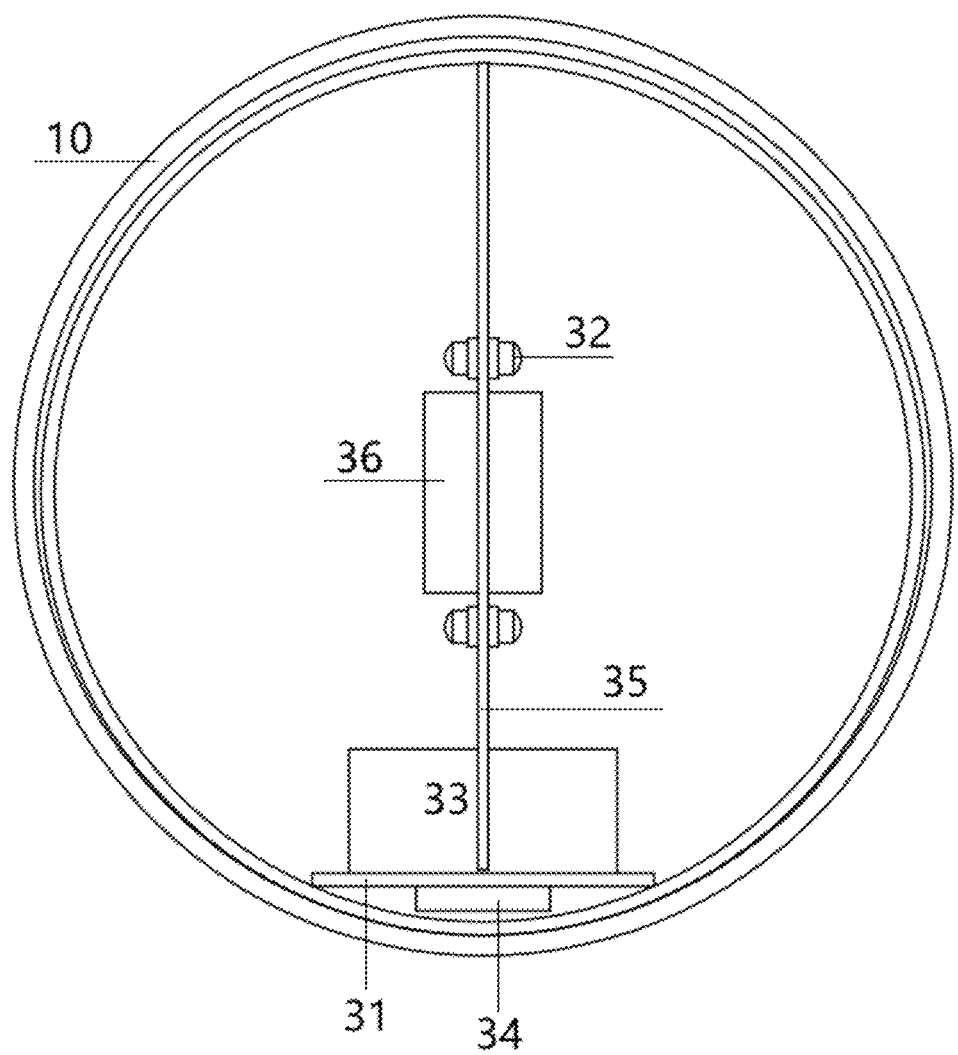

The lampshade 10 is at least partially made of a light-transmitting material, for example, the yin-yang spherical lampshade shown in FIG. 1 may be used to achieve the above-mentioned moon-phase lamp visual lighting effect, or alternatively is made of a single light-transmitting material (for example, lampshades of a vase-design shown in FIG. 7 and FIG. 8, or the spherical lampshades of a conventional design shown in FIG. 9 and FIG. 10). In addition, the surface of the lampshade 10, in particular the outer surface, may also be a rough surface, similar to a planet, moon, or asteroid having a spherical uneven surface. The lampshade 10 can be a molded piece and/or a 3D printed piece.

The light-emitting ball shown in FIG. 2 has a transparent or translucent spherical housing 30 in which a balance weight 33, a wireless power supply receiver coil 31 arranged around the balance weight 33, and a light source 32 powered by the receiver coil 31 are fixedly disposed. The balance weight 33 weights dominantly in the whole light-emitting ball, for example, above 60%, or even more than 90%. In addition, the base 20 is correspondingly provided with a wireless power supply transmitter coil 21.

In the embodiment shown in FIG. 2, due to the dominant gravity impact of the balance weight 33, no matter the spherical lampshade 10 is at whatever a posture placed on the base 20, the light-emitting ball would roll correspondingly down to the lowest gravity center position in the lampshade 10, such that the posture of the receiver coil 31 fixedly arranged around the balance weight 33 relative to the transmitter coil 21 in the base 20 can be kept unchanged constantly, that is, the receiver coil 31 and the transmitter coil 21 can always be kept aligned. As shown in FIG. 2, the transmitter coil 21 is horizontally arranged on the base 20, and the receiver coil 31 in the light-emitting ball at the lowest gravity center position is also in a horizontal arrangement state; when the spherical lampshade 10 is placed in any posture or placed at a central set position of the base 20, the relative posture (including orientation and distance) of the receiver coil 31 and the transmitter coil 21 remains substantially unchanged, that is, both can always be aligned vertically (up and down). When the base is connected to an external power supply, effective wireless power supply to the light source 32 can be achieved through mutually aligned transmitter coil 21 and receiver coil 31.

Although not specifically shown, the light-emitting ball of FIG. 2 may also be provided with electronic control elements such as a circuit board to realize controllable power supply of the receiver coil 31 to the light source 32.

Figure 3:
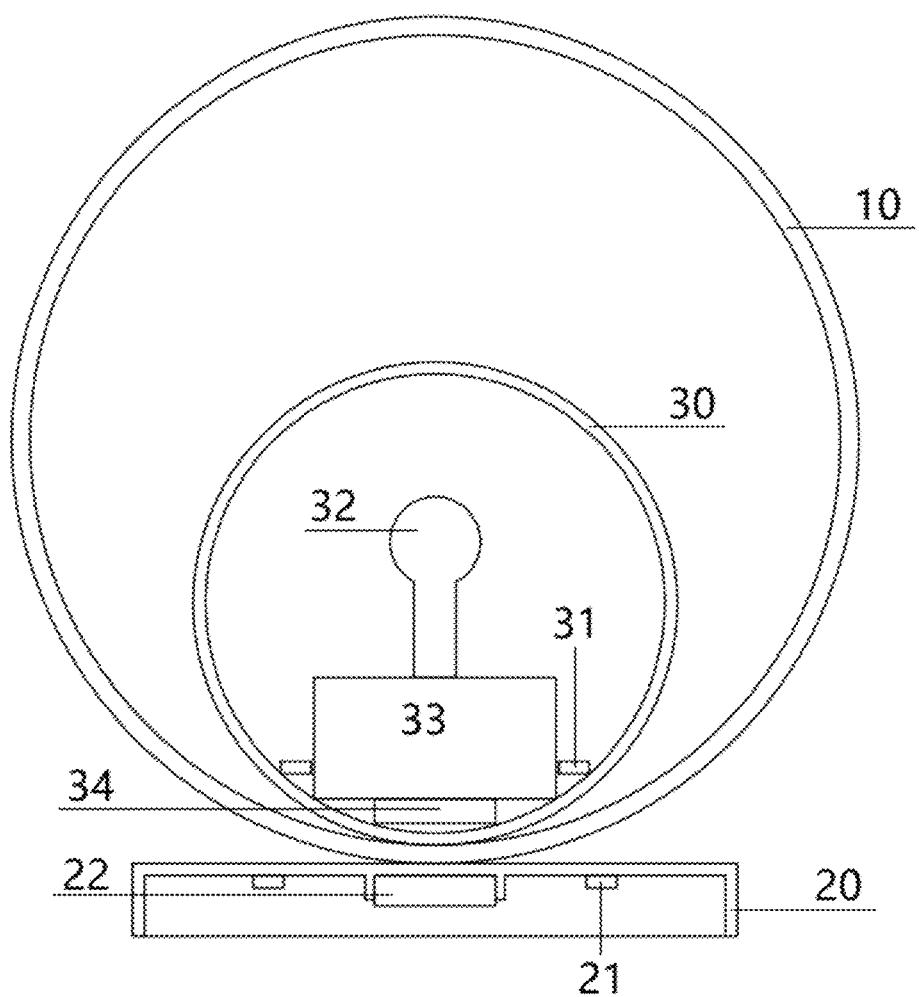

The embodiment shown in FIG. 3 is similar to FIG. 2, except that a magnetic member 34 is additionally disposed in the light-emitting ball and a magnetic member 22 is additionally disposed in the base 20. At least one of the magnetic member 34 and the magnetic member 22 is a magnet, and the other may be a magnet or iron so that a magnetic attraction force would be generated thereby. For example, the magnetic member 34 is a horizontally positioned strip-shaped magnet (having horizontal magnetic poles N-S), the magnetic member 22 is also a horizontally positioned strip-shaped magnet (having horizontal magnetic poles S-N), and the opposite magnetic poles of the magnetic member 22 and the magnetic member 22 are vertically aligned. For another example, the magnetic member 34 may include several independent cylindrical magnets (having upper and lower magnetic poles N-S and/or S-N), the magnetic member 22 also includes several corresponding independent cylindrical magnets (having upper and lower magnetic poles S-N and/or N-S), and when the magnetic members 34 are aligned with the magnetic members 22, their corresponding mating magnets attract each other. By means of the magnetic action of the magnetic member, the position of the light-emitting ball or the receiver coil 31 therein relative to the base 20 or the transmitter coil 21 therein can be adjusted more quickly and accurately. In this embodiment, the balance weight 33 may also be omitted, and only the magnetic member 34 and the magnetic member 22 that cooperate with each other may be used.

Figure 4:
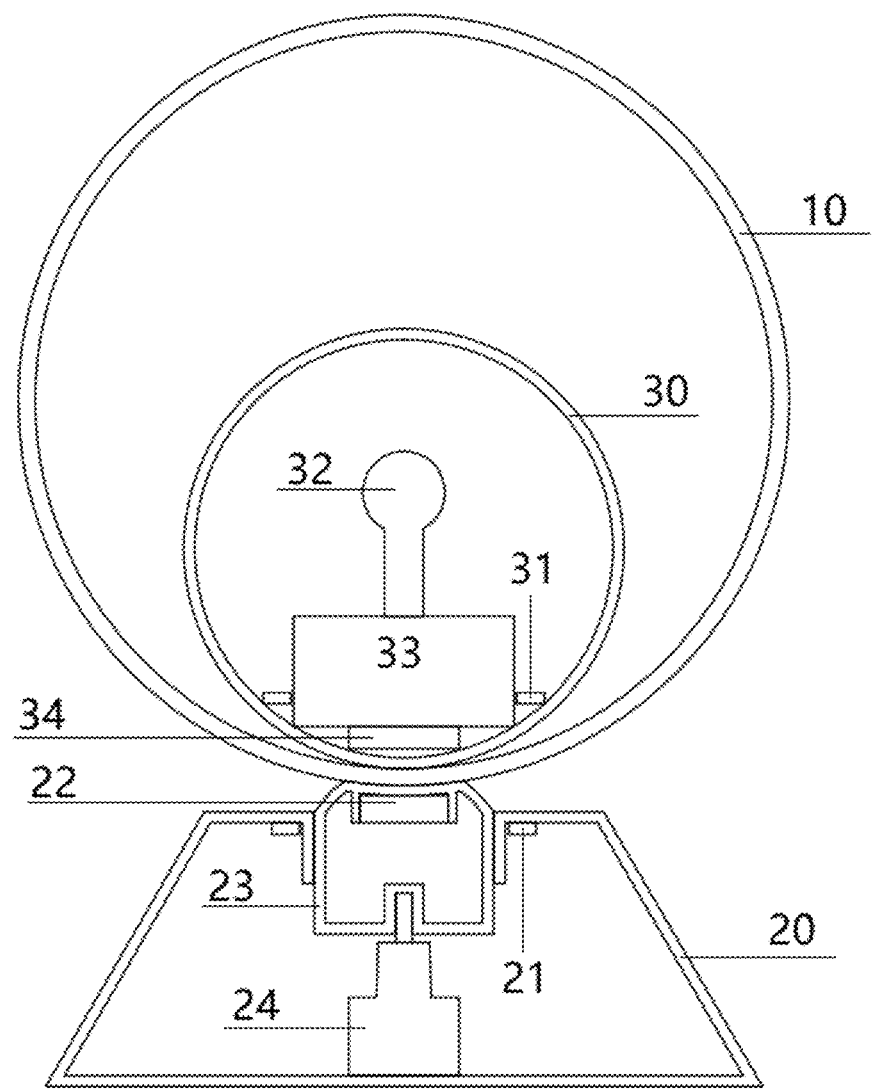

The embodiment shown in FIG. 4 is similar to FIG. 3, except that the rotatable support 23 is disposed on the base 20, the magnetic member 22 is disposed at the top of the support 23, and the support 23 can be driven by the motor 24 fixedly disposed in the base 20 to rotate horizontally. When the spherical lampshade 10 is disposed on the support member 23 of the base 20, due to the gravity action of the balance weight 33 and/or the magnetic attraction effect of the magnetic member 34 and the magnetic member 22, the lampshade 10 can be driven to rotate when the vertical rotation output shaft of the motor 24 drives the support member 23 of the base 20 to rotate horizontally, so as to obtain a correspondingly dynamic visual lighting effect.

Figure 5:
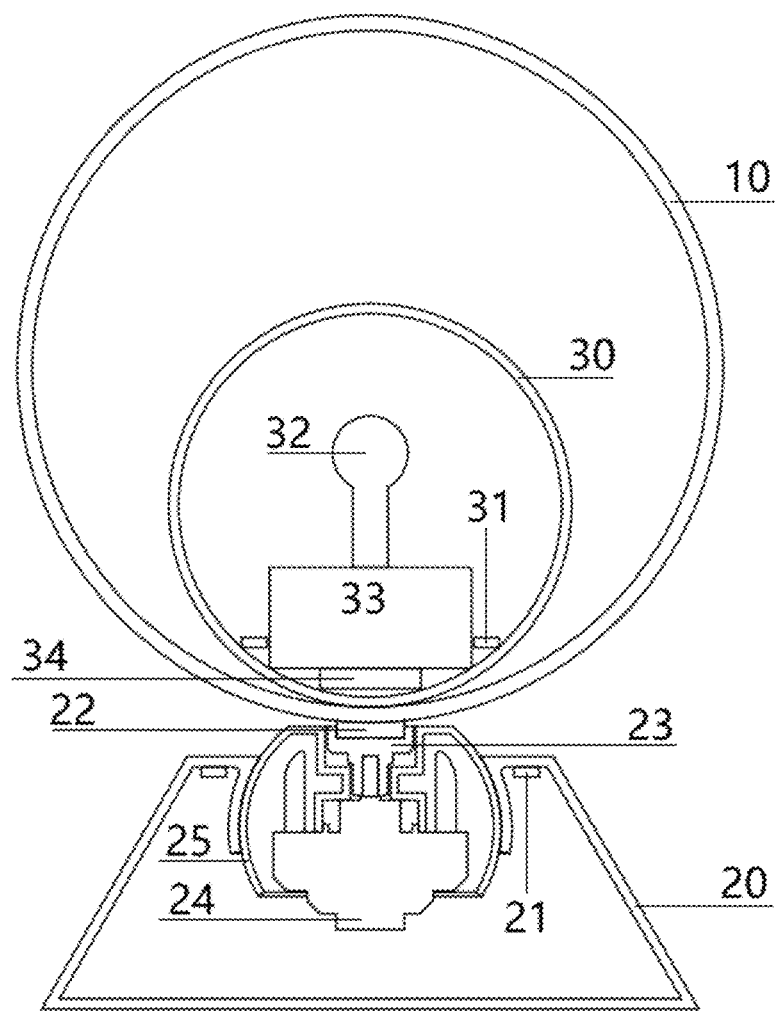

The embodiment shown in FIG. 5 is similar to FIG. 4, except that a manual rotating member 25 is additionally arranged on the base 20, and the supporting member 23 is arranged on the rotating member 25, so that corresponding inclined rotation of the supporting member 23 driven by the rotation shaft of the motor 24 can be similarly realized by manually adjusting the rotation position of the rotating member 25 in the vertical plane. The embodiment shown in FIG. 5 is particularly suitable for use as a light-emitting globe. The spherical lampshade 10 can be rotated obliquely with respect to the base 20 at a specific angle.

Figure 6:
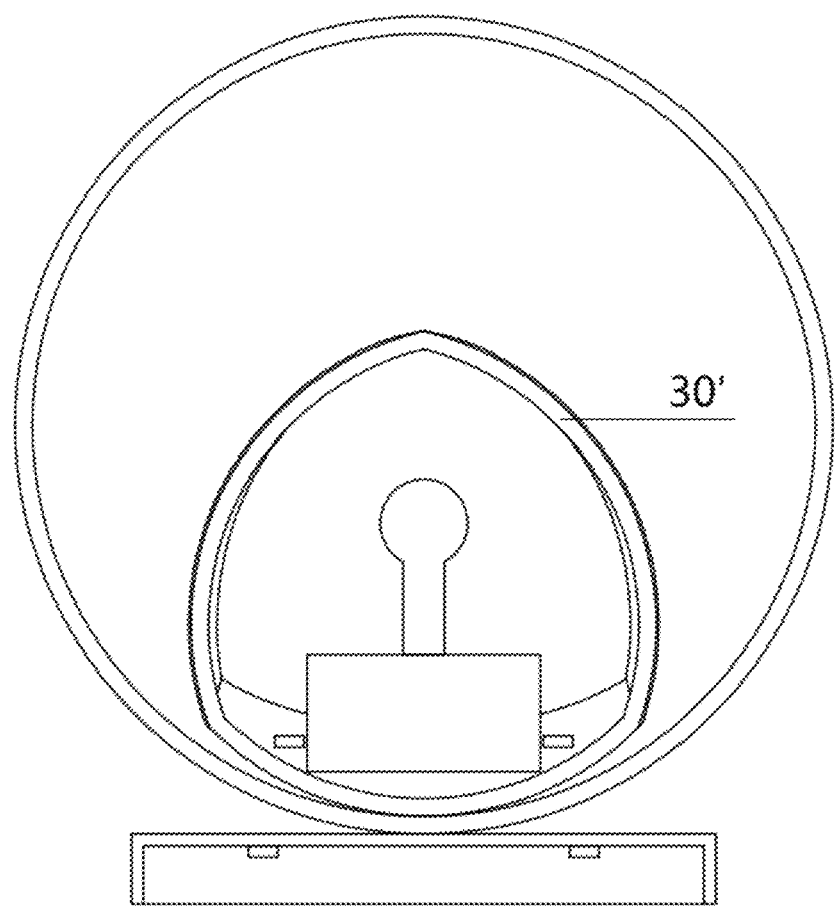

The embodiment shown in FIG. 6 is similar to FIG. 2, except that, instead of a spherical housing, a housing 30' in the form of a rollable tetrahedron is used with the light-emitting object in the lampshade.

The embodiment shown in FIGS. 7 and 8 is similar to FIG. 2, except that, instead of being designed in the form of the spherical lampshade 10, the lampshade 10' is designed in the form of a round-belly vase. As shown in FIGS. 7 and 8, regardless of placement postures of the lampshade 10', the receiver coil therein can always be in a position to be aligned mutually with the transmitter coil in the base. In this embodiment, the light-emitting ball can be conveniently placed into the vase or the lampshade 10' through opening thereof.

The embodiment shown in FIG. 9 and FIG. 10 is similar to FIG. 3, except that the base 20 is dispensed with, and that the outer diameter of the spherical housing 30 of the light-emitting ball in the spherical lampshade 10 is increased to be slightly smaller than the inner diameter of the lampshade 10. The spherical housing 30 of this embodiment is provided therein with a light-isolation circular plate 35 dividing the interior of the spherical housing 30 into two halves, on each side of which an independently controlled light source 32 and a rechargeable battery 36 can be provided. A receiver coil 31 is provided at the lower part of the light-isolation circular plate for supplying power to the light source 32 and the rechargeable battery 36. As shown in FIG. 10, the light-isolation circular plate 35 is disposed on the balance weight 33, and the magnetic member 34 can also be disposed below the balance weight 33. In this configuration, the receiver coil 31 can be quickly positioned in the correct power supply posture, and at the same time the light-isolation circular plate 35 can be oriented in the vertical position.

In the embodiment shown in FIG. 9 and FIG. 10, the lampshade 10 needs not to be designed in the form of a yin-yang spherical lampshade shown in FIG. 1, and a normal light-transmitting lampshade can achieve the visual lighting effect of the moon-phase lamp just by means of the light-isolation circular plate 35 or the partition plate.

Figure 11:
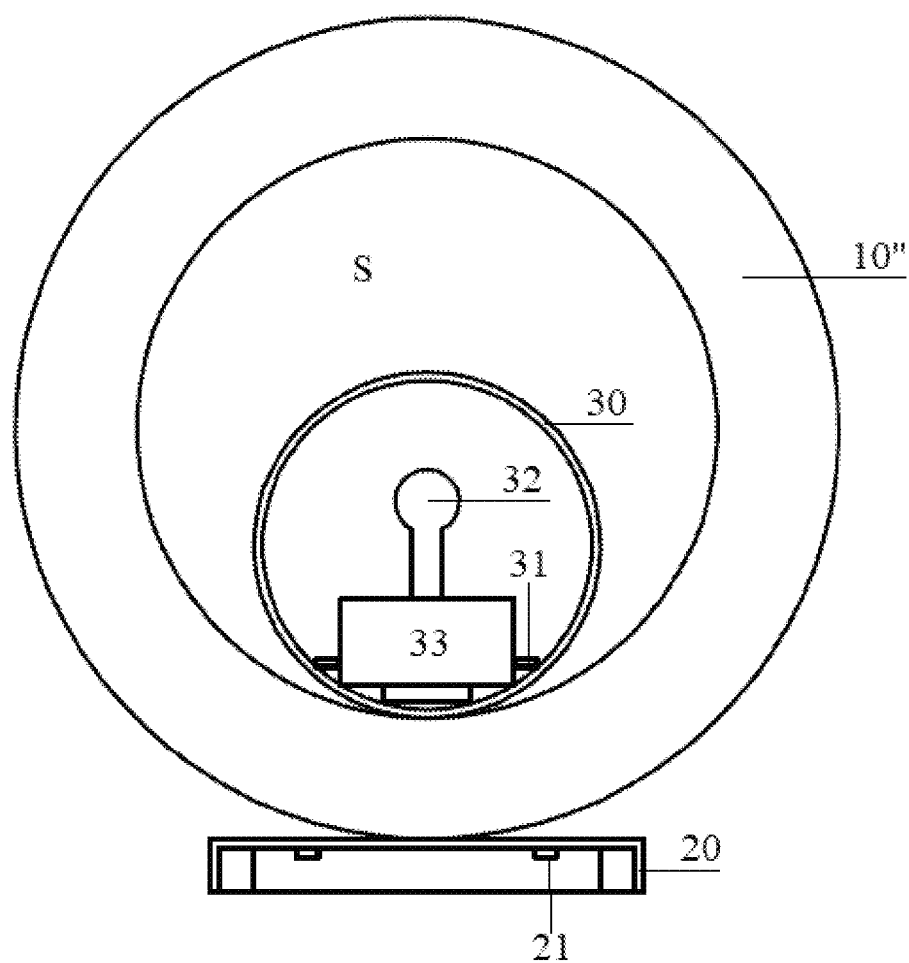
FIGS. 11 and 12 respectively show schematic structural sectional views of two different embodiments of a lamp in the form of a bouncing ball according to the present application.

The embodiment shown in FIG. 11 is a bouncing light-emitting ball, which has structure similar to that of FIG. 2, except that a thicker transparent outer spherical housing 10" made of an elastic silica gel is used instead of the lampshade 10 of FIG. 2. A suitable fluid, such as a transparent liquid or air can be filled between the outer spherical housing 10" and the inner spherical housing 30. Although not specifically shown, the inner spherical housing 30 can also be provided fixedly with a secondary battery to supply power to the light source 32 therein. In this case, the secondary battery can be conveniently recharged by the receiver coil 31.

Figure 12:
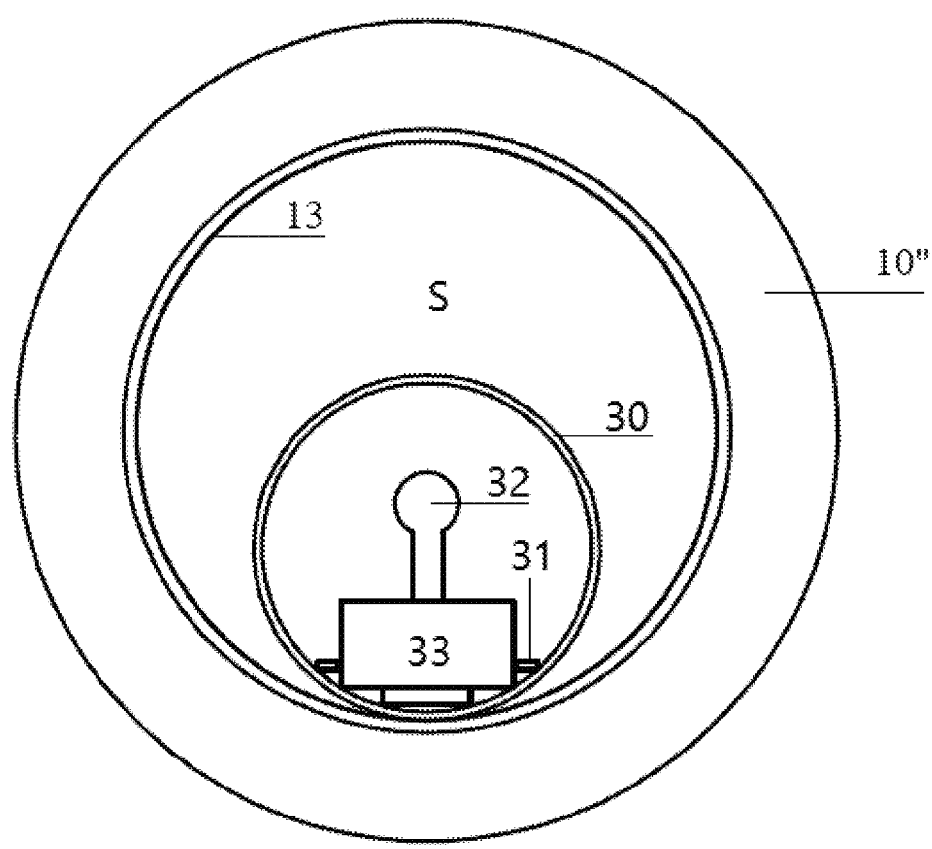

The bouncing light-emitting ball of the embodiment shown in FIG. 12 is a variation of the embodiment shown in FIG. 11. The inner wall of the outer spherical housing 10" is additionally provided with a thinner hard transparent middle spherical housing 13 made of organic glass, for example. In this case, upon placing the inner spherical housing 30 into the middle spherical housing 13, the outer spherical housing 10" can be injection molded once for all on the middle spherical housing 13, so that the outer spherical housing 10" has a complete spherical surface without leaving any seams.

Figure 13:
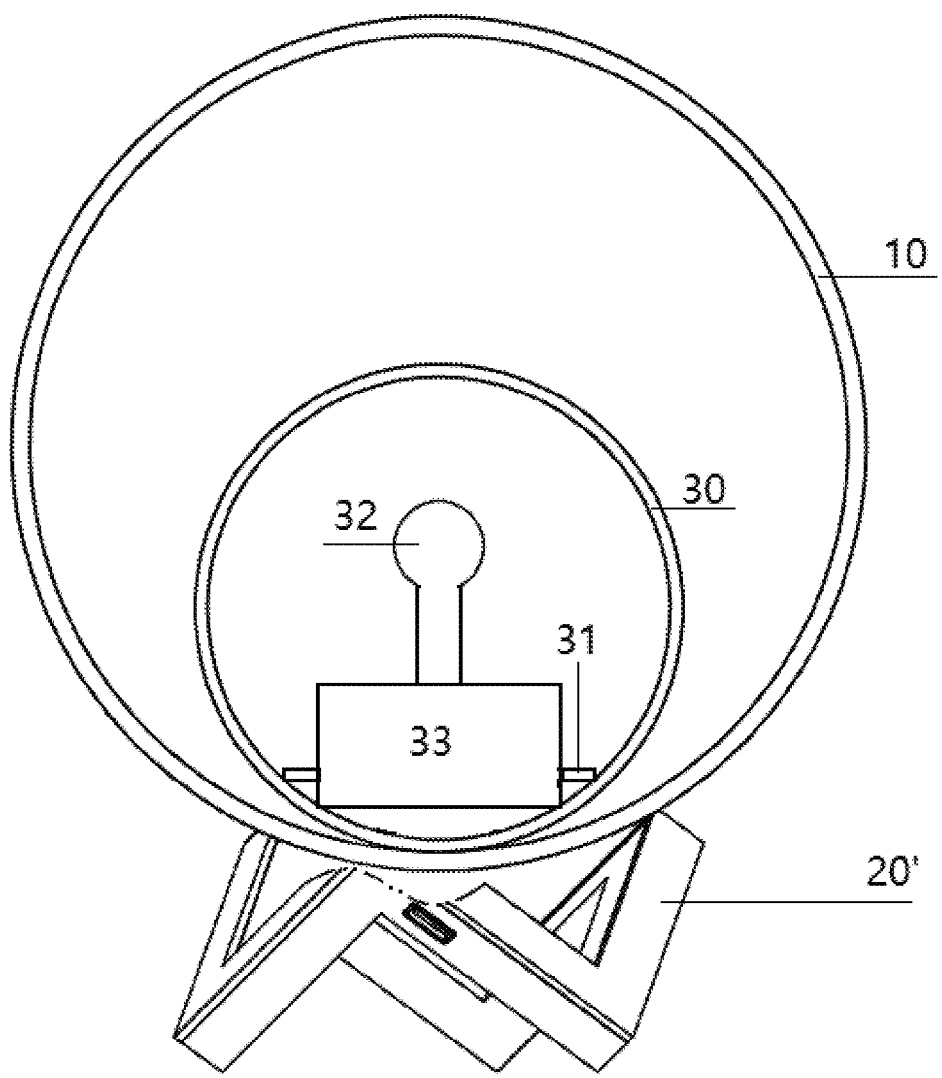
FIG. 13 illustrates another embodiment of a lamp according to the present application.
Figure 14:
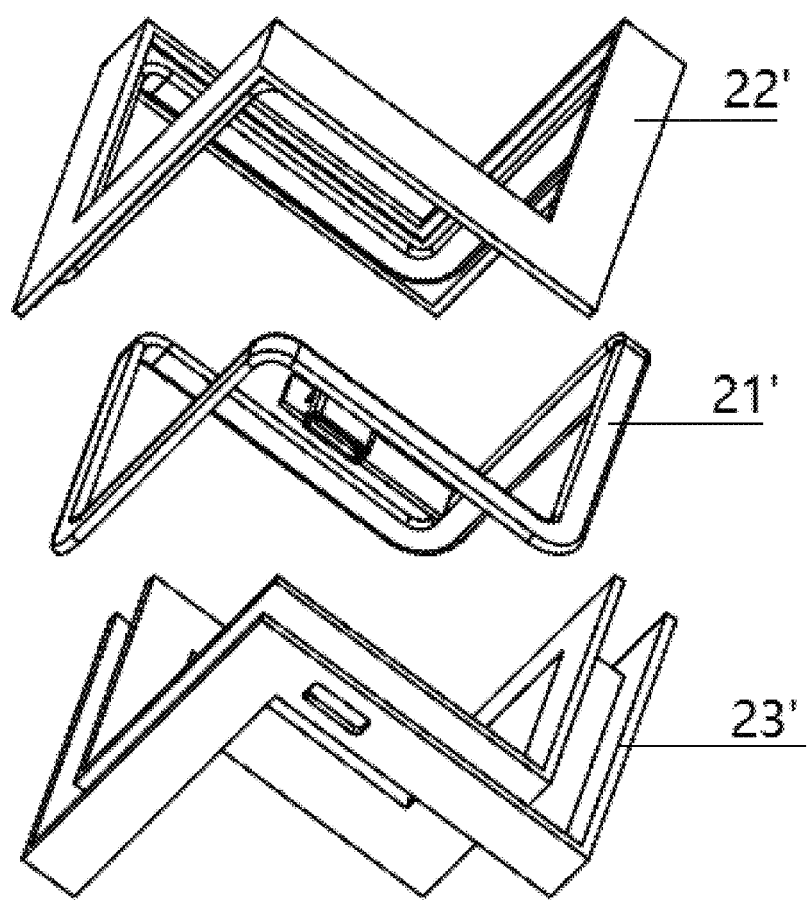
FIG. 14 shows an exploded view of the charger base according to the embodiment shown in FIG. 13.

The embodiment shown in FIG. 13 is similar to FIG. 2, except that a combined charger base 20' is used. As further shown in FIG. 14, the base 20' includes an upper housing 22', a lower housing 23', and a transmitter coil 21' sandwiched therebetween. The shape of the transmitter coil 21' corresponds to that of the supporting base 20', each are in the form of a tripod with three V-shaped supporting legs being connected to each other. In this case, the transmitter coil 21' can be ingeniously hidden in the tripod base 20', so that the entire device is extremely simple and compact.

Figure 15:
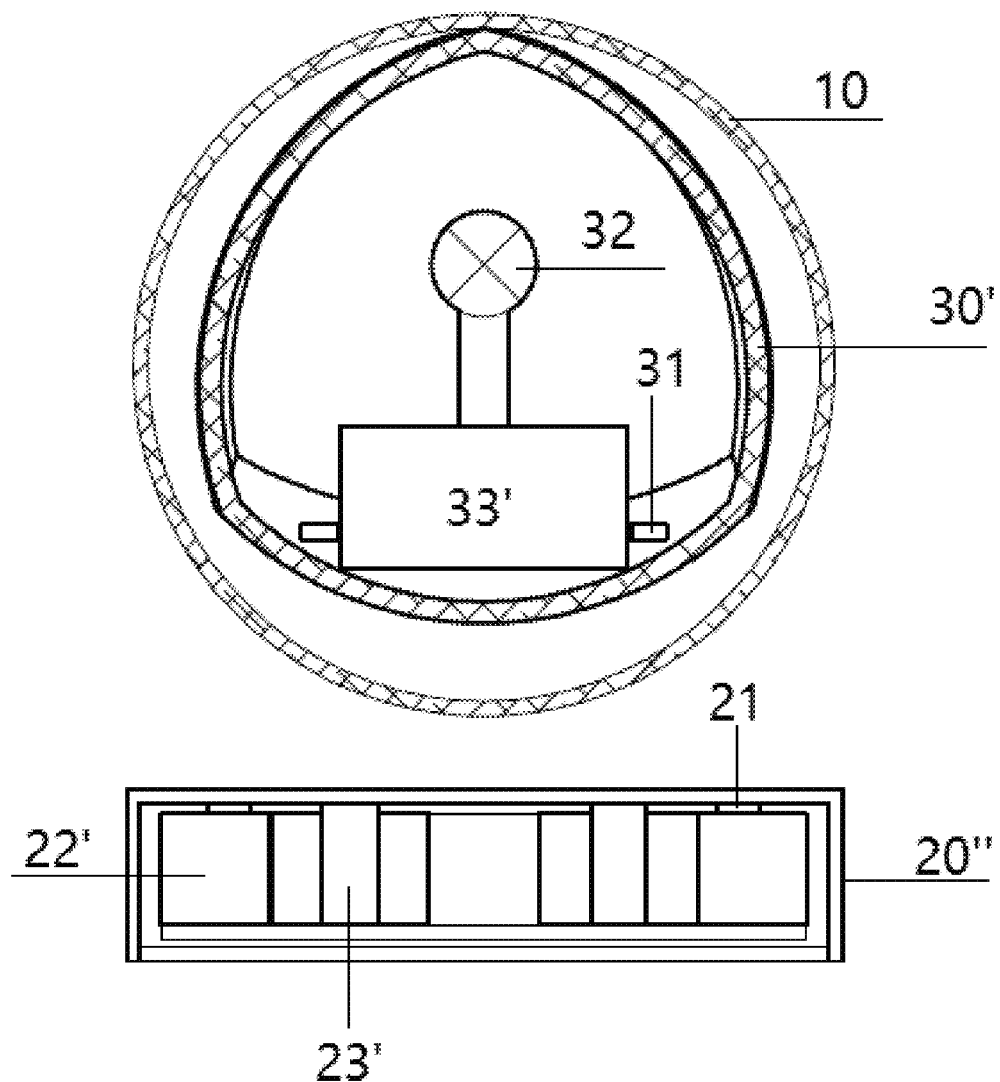
FIGS. 15 and 16 show embodiments of a maglev lamp according to the present application, respectively.

The embodiment shown in FIG. 15 is similar to FIG. 6, except that it takes the form of a magnetic levitation structure. Specifically, in the magnetic levitation lamp shown in FIG. 15, a balance weight 33' in the form of a cylindrical magnet is used, and a base 20" in the form of a magnetic levitator. The base 20" includes a ring magnet 22', an electromagnetic coil 23', and a wireless power supply transmitter coil 21 to be coupled with a wireless power supply receiver coil 31 in a levitating light-emitting ball. The specific structure and working principle of the magnetic levitation device are well known in the art, which will not be described in detail herein for the sake of brevity; see for example, CN100544183C and U.S. Pat. No. 7,505,243B2, both of which are incorporated herein by reference in their entirety.

Figure 16:
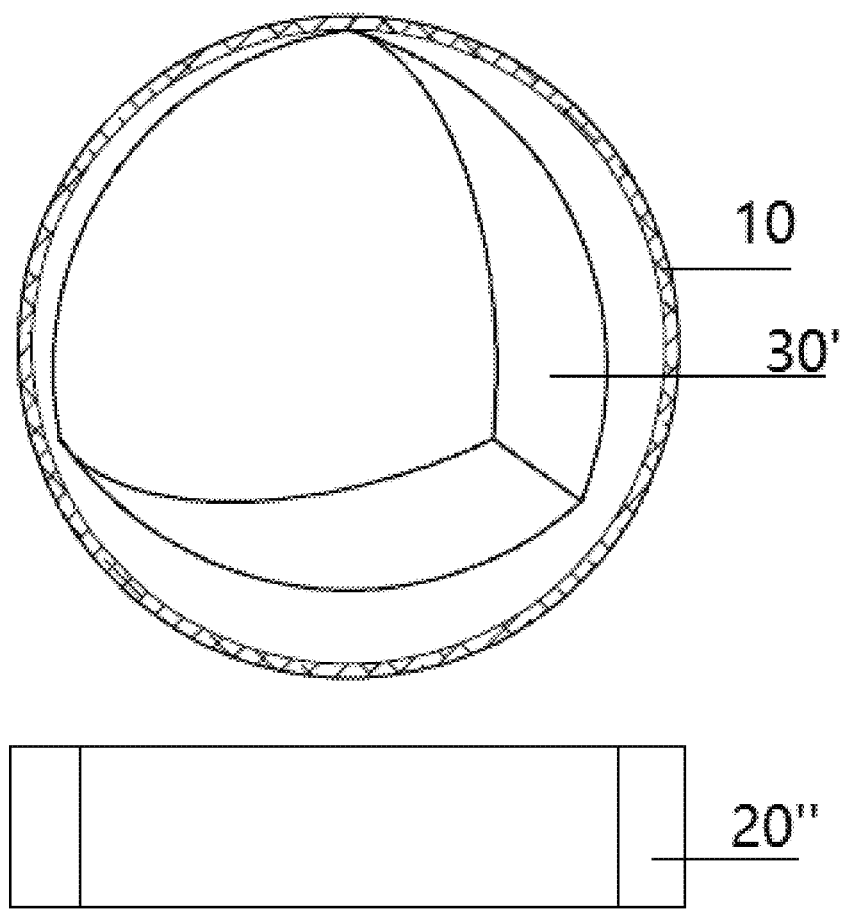

FIG. 16 shows, in simplified form, the maglev lamp shown in FIG. 15. The tetrahedral housing 30' is levitated above the base 20' in a predetermined position, and the spherical lampshade 10 is suspended at the top position of the housing 30'. In this case, since the spherical lampshade 10 only leans on the housing 30', any free turn of the spherical lampshade 10 relative to the housing 30' can be achieved.

According to the magnetic levitation lamp shown in FIG. 15 and FIG. 16, not only the lampshade 10 can be turned freely, but also the cylindrical magnet fixed on the balance weight 33' can be automatically oriented vertically relative to the lampshade 10 due to the self-alignment of the balance weight 33' in the gravity direction. When the lamp or the lamp shade 10 is operated to levitate relative to the horizontally oriented levitator base 20", for example, by hand-holding the lampshade 10 or placing it on the base 20" to automatically perform the levitation process, the movable magnet in the lampshade 10 can be automatically oriented as described above due to the gravity impact of the balance weight 33', so that the movable magnet may easily be manually or automatically levitated above the horizontal base 20". This ingeniously resolves the problem such as that the movable magnet in a closed levitating object is difficult to be centered and levitated relative to the base.

Those skilled in the art will appreciate that although not specifically shown, the housing 30' and the lampshade 10 suspended thereon may also be levitated below the levitator in the form of a hanger. The specific structure and working principle of such a magnetic-attraction-type levitation device are also well known in the art, which will not be described in detail herein for the sake of saving space; see, for example, CN2561163Y, which is also incorporated herein by reference in its entirety.

What is claimed is:

1. A lamp comprising:
   a lampshade, at least part of which is made of a light-transmitting material;
   an independent unit, movably disposed in the lampshade, on which a light source and a wireless power supply receiver coil are fixedly mounted, wherein the wireless power supply receiver coil is configured to supply power to the light source; and
   a base which is provided fixedly with a wireless power supply transmitter coil to be coupled with the wireless power supply receiver coil of the independent unit,
   wherein when the lampshade is randomly positioned on the base, the independent unit in the lampshade has relative to the base a movement tendency which enables the wireless power supply receiver coil on the independent unit and the wireless power supply transmitter coil on the base to be aligned with each other, and
   the lampshade is a closed or semi-closed lampshade, and the independent unit is shaped to be freely rollable along the inner wall of the lampshade.

2. The lamp of claim 1, wherein the independent unit has a transparent housing, and the light source and the wireless power supply receiver coil are both fixedly disposed in the transparent housing.

3. The lamp of claim 2, wherein the independent unit further comprises a partition plate fixedly secured in, and substantially separating the inner space of, the transparent housing, the partition plate is made of a light isolation material, and the light source is arranged on either side of the partition plate.

4. The lamp of claim 3, wherein the lampshade is a spherical lampshade made of a light-transmitting material, and the transparent housing of the independent unit is a spherical housing with an outer diameter slightly smaller than the inner diameter of the spherical lampshade.

5. The lamp of claim 1, wherein the base has a movable element on which is positioned the lampshade so that the lampshade is capable of being moved correspondingly through actuating the movable element of the base.

6. The lamp of claim 5, wherein the base further comprises a motor for actuating the movable element to rotate.

7. The lamp of claim 6, wherein the direction of rotation axis of the movable element is adjustable when the movable element is rotating relative to the base.

8. The lamp of claim 1, wherein the lampshade has a substantially spherical uneven outer surface.

9. The lamp of claim 8, wherein the lampshade is designed to be a celestial body selected from the group consisting of moon, earth, other planets and asteroids.

10. The lamp of claim 1, wherein the movement tendency results from gravity of the independent unit per se.

11. The lamp of claim 1, wherein the independent unit and the base are each provided with a magnetic member, and the movement tendency results from a magnetic attraction force generated between the magnetic members.

12. The lamp of claim 1, wherein the lampshade is a spherical lampshade divided into two halves, one half is less than the other half in light transmittance.

13. The lamp of claim 1, wherein the lampshade is a molded piece and/or a 3D printed piece.

14. The lamp of claim 1, wherein the independent unit in the lampshade is further provided fixedly with a magnet, and the base is in the form of a magnetic levitator, so that the independent unit and thus the lampshade is capable of being levitated above the base through being positioned by the magnet.

15. The lamp of claim 1, wherein the independent unit is further provided fixedly with a rechargeable battery which is capable of being charged through the wireless power supply receiver coil and is capable of being supply power to the light source.

16. The lamp of claim 1, wherein the base is in the form of a tripod with three V-shaped supporting legs being connected to each other, and comprises an upper housing and a lower housing between which the wireless power supply transmitter coil is positively sandwiched.

* * * * *